US009253416B2

(12) United States Patent
Dunn et al.

(10) Patent No.: US 9,253,416 B2
(45) Date of Patent: Feb. 2, 2016

(54) MODULATION OF BACKGROUND SUBSTITUTION BASED ON CAMERA ATTITUDE AND MOTION

(75) Inventors: Gregory J. Dunn, Arlington Heights, IL (US); Terance B. Blake, Palatine, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 2235 days.

(21) Appl. No.: 12/142,297

(22) Filed: Jun. 19, 2008

(65) Prior Publication Data

US 2009/0315915 A1    Dec. 24, 2009

(51) Int. Cl.

| G09G 5/00 | (2006.01) |
|---|---|
| H04N 5/272 | (2006.01) |
| H04M 1/725 | (2006.01) |
| H04N 5/232 | (2006.01) |
| H04N 5/262 | (2006.01) |
| G06T 11/60 | (2006.01) |
| H04N 7/14 | (2006.01) |

(52) U.S. Cl.
CPC .............. *H04N 5/272* (2013.01); *G06T 11/60* (2013.01); *H04M 1/72544* (2013.01); *H04N 5/232* (2013.01); *H04N 5/2621* (2013.01); *H04M 2250/12* (2013.01); *H04M 2250/52* (2013.01); *H04M 2250/62* (2013.01); *H04N 2007/145* (2013.01)

(58) Field of Classification Search
USPC ................................................. 345/629, 158
See application file for complete search history.

(56) References Cited

U.S. PATENT DOCUMENTS

| 6,201,554 | B1 * | 3/2001 | Lands ........................... 345/169 |
|---|---|---|---|
| 6,288,704 | B1 * | 9/2001 | Flack et al. .................... 345/158 |
| 6,466,198 | B1 * | 10/2002 | Feinstein ....................... 345/158 |
| 6,556,185 | B2 | 4/2003 | Rekimoto ...................... 345/157 |
| 6,577,821 | B2 * | 6/2003 | Malloy Desormeaux .... 396/374 |
| 6,626,687 | B2 * | 9/2003 | Homer et al. .................. 439/151 |
| 6,798,429 | B2 * | 9/2004 | Bradski .......................... 345/156 |
| 6,847,351 | B2 * | 1/2005 | Noguera ........................ 345/158 |
| 7,003,136 | B1 * | 2/2006 | Harville ......................... 382/103 |
| 7,138,979 | B2 * | 11/2006 | Robin et al. ................... 345/158 |
| 7,142,231 | B2 * | 11/2006 | Chipchase et al. .......... 348/14.02 |
| 7,184,040 | B1 * | 2/2007 | Tzvetkov ....................... 345/421 |

(Continued)

FOREIGN PATENT DOCUMENTS

| EP | 1884864 | 2/2008 |
|---|---|---|
| JP | 2006128754 A | 5/2006 |
| JP | 2006146846 A | 6/2006 |

OTHER PUBLICATIONS

PCT Search Report Dated Dec. 24, 2009.

(Continued)

*Primary Examiner* — M Good Johnson
(74) *Attorney, Agent, or Firm* — Kenneth A. Haas

(57) ABSTRACT

A device and method of background substitution are disclosed. One or more cameras in a mobile device obtain a depth image. A processor in or external to the device segments the foreground from the background of the image. The original background is removed and a stored background image or video is substituted in place of the original background. The substituted background is altered dependent on the attitude and motion of the device, which is sensed by one or more sensors in the device. A portion of the stored background selected as the substitute background varies in correspondence with the device movement.

20 Claims, 12 Drawing Sheets

(56) References Cited

U.S. PATENT DOCUMENTS

| | | | |
|---|---|---|---|
| 7,203,356 B2* | 4/2007 | Gokturk et al. | 382/154 |
| 7,227,567 B1* | 6/2007 | Beck et al. | 348/14.07 |
| 7,372,977 B2* | 5/2008 | Fujimura et al. | 382/103 |
| 7,400,361 B2* | 7/2008 | Noske et al. | 348/578 |
| 7,431,216 B2* | 10/2008 | Weinans | 235/472.01 |
| 7,533,569 B2* | 5/2009 | Sheynblat | 73/510 |
| 7,567,818 B2* | 7/2009 | Pylkko | 455/550.1 |
| 7,590,262 B2* | 9/2009 | Fujimura et al. | 382/104 |
| 7,626,598 B2* | 12/2009 | Manchester | 345/659 |
| 7,719,733 B2* | 5/2010 | Schilling et al. | 359/2 |
| 7,970,586 B1* | 6/2011 | Kahn et al. | 702/189 |
| 2002/0024506 A1* | 2/2002 | Flack et al. | 345/169 |
| 2003/0076408 A1 | 4/2003 | Dutta | |
| 2003/0174285 A1 | 9/2003 | Trumbull | |
| 2005/0259870 A1* | 11/2005 | Kondo et al. | 382/173 |
| 2006/0017692 A1* | 1/2006 | Wehrenberg et al. | 345/156 |
| 2006/0061551 A1* | 3/2006 | Fateh | 345/158 |
| 2006/0268008 A1 | 11/2006 | Idesawa | |
| 2008/0043108 A1* | 2/2008 | Jung et al. | 348/207.1 |

OTHER PUBLICATIONS

Canadian Office Action Dated Aug. 4, 2014 for Counterpart Application 2,728,036.

EPC Office Action Dated Jul. 8, 2014 for Counterpart Application 09 767 514.4.

Bogumil Bartczak, et al. "Integration of a Time-of-Flight Camera Into a Mixed Reality System for Handling Dynamic Scenes, Moving Viewpoints and Occlusions in Real-Time", Proceedings of 3DPVT-08—The Fourth International Symposium on 3D Data Processing, Visualization and Transmission, Jun. 18, 2008, pp. 1-8, XP055115313.

Benjamin Huhle, et al. "On-the-Fly Scene Acquisition With a Handy Multisensor-System", Internationl J. of Intelligent Systems Technologies and Applications, Jan. 1, 2007, pp. 1-9, XP055115315.

Eisert, P. "Immersive 3-D Video Conferencing: Challenges, Concepts, and Implementations", Proceedings of SPIE, SPIE International Society for Optical Engineering, US, vol. 5150, Jul. 8, 2003, pp. 69-79, XP002433012; ISSN:0277-786X, DOI: 10.1117/12.509896.

Canadian Office Action Dated Apr. 4, 2013 for Counterpart Application 2,728,036.

Korean Office Action Dated Jan. 2013 for Counterpart Application 10-2010-7028459.

Canadian Office Action Dated Oct. 6, 2011 for Counterpart Application No. 2,728,036.

Korean Office Action Dated May 29, 2012 for Counterpart Application No. 10-2010-7028459.

PCT International Preliminary Report on Patentability mail dated Dec. 24, 2009 for Application No. PCT/US2009/047079.

* cited by examiner

MODULATION OF BACKGROUND SUBSTITUTION BASED ON CAMERA ATTITUDE AND MOTION

TECHNICAL FIELD

The present application relates to a mobile device image. In particular, the application relates to the change of a substitute background with movement of the mobile device.

BACKGROUND

With the advent of a mobile society, portable devices such as cellular telephones and laptop computers have become ubiquitous. Increasingly, such devices are used in a variety of teleconferencing situations in which the user is present at the office, at home, or while traveling. Cameras, which have fairly recently been incorporated in these devices, permit users to videoconference. In certain circumstances, it is desirable to replace the actual background of the user with a different background. However, the limited processing ability of the mobile devices often limits the ability of these devices to provide realistic background substitution. The realism of the substitute background is further decreased in situations in which the mobile device, and thus the integral camera, is not stationary. One problem lies in that as the camera moves, it is expected that the angle and position of the objects in the substitute background will change in a similar fashion. Motion due to the camera movement should thus affect all elements in the substitute background. To date, however, mobile devices do not have such capability; if the mobiles device moves, the foreground (user) will move without a similar motion of background. Moreover, in an environment that contains moving objects, such as a room with a window or an airport, moving elements in the original background that are alien to the substitute background will not be removed and thus will appear and disappear in the substitute background. It is desirable to overcome such problems and accordingly be able to provide a more realistic background substitution.

BRIEF DESCRIPTION OF THE DRAWINGS

Embodiments will now be described by way of example with reference to the accompanying drawings, in which.

DETAILED DESCRIPTION

A mobile device and method of background substitution are disclosed. One or more imagers in a mobile device obtain a depth image. A processor in the device segments a foreground element, such as a person, of the image from the background of the image. The original background is removed and a stored background, which may be an image or a video, replaces the original background. The substituted background changes dependent on the attitude and motion of the device, which is sensed by one or more sensors in the device. The rate of motion and attitude of the substitute background are controlled to match the rate of movement and attitude of the device. The substitute background may be static or may have elements with motion, e.g., rhythmic motion. A virtual barrier defining the separation of foreground from the original background is manually adjustable or automatically adjusted dependent on the device attitude. One or more selectable backgrounds are stored internal or external to the mobile device and, if stored externally, may be buffered in the device to enable a processor in the device to more realistically alter the substitute background in real time or near real time. A portion of a video or larger image may be used as the substitute background, in which case the portion to be used changes with the motion of the device and may loop to a different location if an edge of the image is reached. If the mobile device has a display, the composite image containing the original foreground and substitute background may be displayed on this display. This enables the user to view the composite image as it appears to other users and to change to a different background (or to return to the original background) if desired.

As used herein, a depth image is an image comprised of pixels that have not only intensity and color information, but also contain depth information corresponding to the portion of the image captured by each particular pixel. Such images are known in the art, one example of which being digital stereoscopic images. Images containing depth information are often created using, for example, two image capture inputs (imagers) in a simultaneous manner, such as from a stereo camera system. As the manner in which the depth images are obtained is known, for the sake of brevity and for the purpose of clarity, further elaboration in this regard will not be provided herein.

Figure 1:
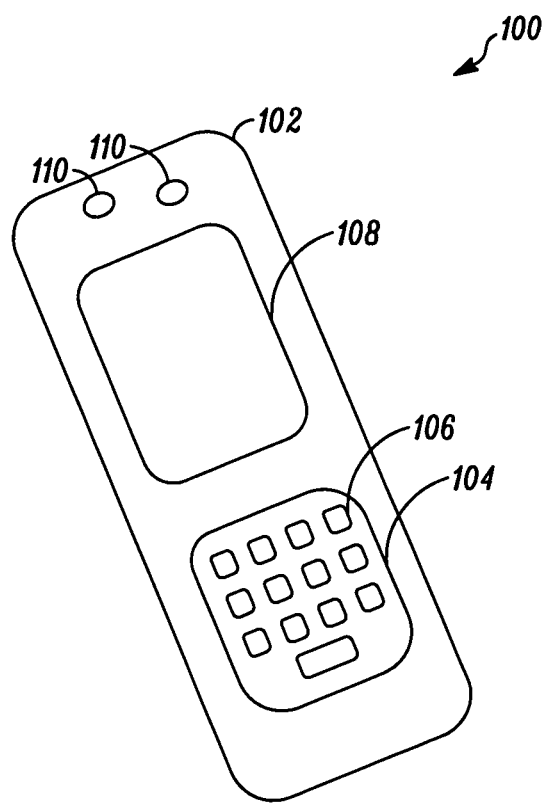
FIG. 1 illustrates a mobile device according to one embodiment.

Typical mobile devices include cellular telephones, push-to-talk (PTT) devices, smart phones, PDAs, laptop computers, and others. A typical cellular (cell) phone 100 is shown in FIG. 1. The phone 100 has a body 102 that contains an input area 104 containing keys 106. The device 100 contains a display 108 that shows information such as phone numbers, text messages, internet information, the user and background, etc. The device 100 also contains multiple imagers (hereinafter also referred to as cameras) 110. The cameras 110 can be disposed at any location on the front and/or back of the device 100 such that a stereoscopic image is formed. Other input/output (I/O) devices such as microphones, wheels, joysticks, soft (software defined) or hard keys, touchscreens, speakers, antennas, and assorted I/O connections may be present in the mobile device but are not shown in the cell phone 100 of FIG. 1 for convenience.

Figure 2:
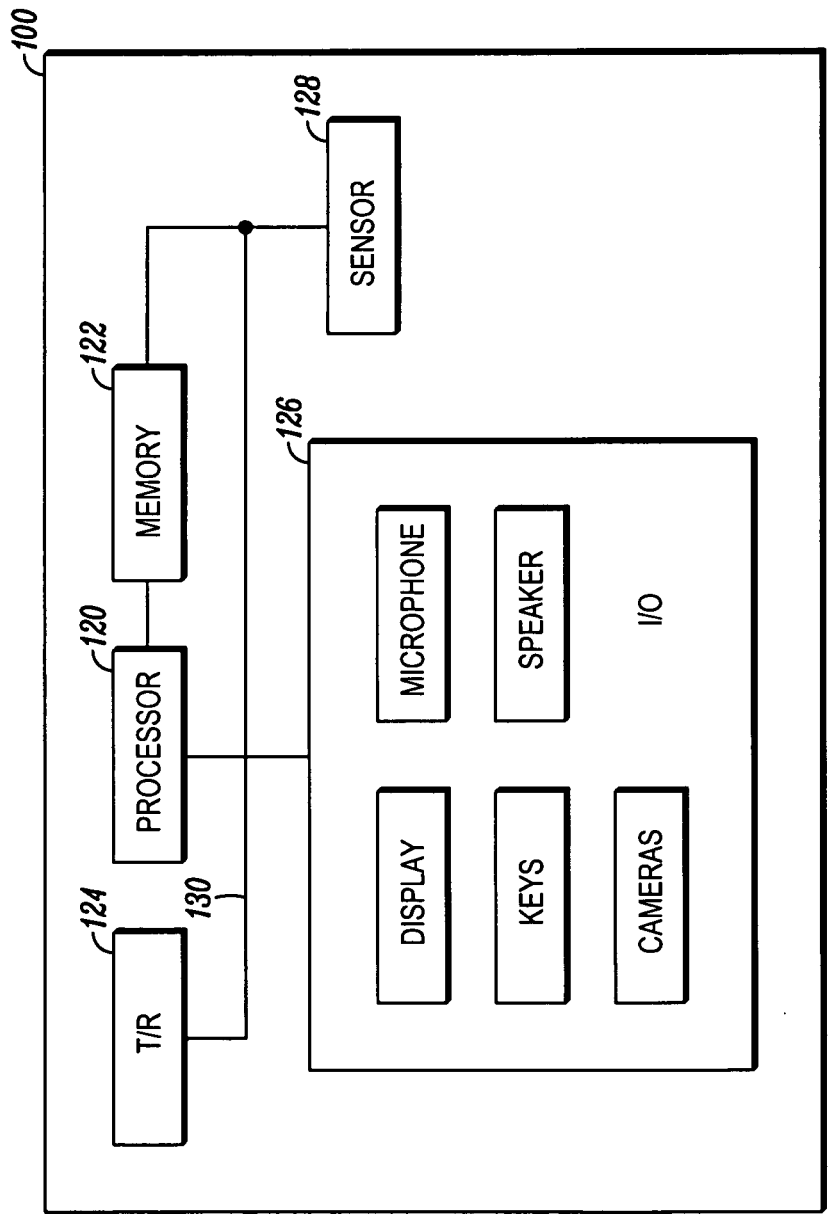
FIG. 2 illustrates internal circuitry of the mobile device of FIG. 1.

The cell phone 100 also contains internal components and circuitry that control and process information and elements of the device 100. For example, as shown in FIG. 2, the cell phone 100 contains a processor 120, a memory 122, transmit/receive circuitry 124, input/output circuitry 126, and a sensor

128 among other components that are not shown for clarity that are connected by a system bus 130 that operatively couples various components to the processor 120. The I/O circuitry 126 contains circuitry that is connected to the display 108, keys 106, cameras 110, microphone, speaker, etc. The sensor 128 may be an accelerometer and/or a gyroscope, for example. In one embodiment, the sensor 128 is formed from a conventional microelectromechanical systems (MEMS) device. In another embodiment, the sensor 128 and one or more of the cameras 110 may be the same element; that is, methods of using image analysis to determine camera motion are known in the art, and these methods may be used to obviate the need for a separate sensor 128, or may be used in combination with sensor 128 to determine attitude and motion of the cell phone 100. Although only one of the various elements of the cell phone 100 is shown in FIGS. 1 and 2, multiple elements may be present. For example, multiple gyroscopes and/or accelerometers or a combination thereof may be used to obtain more accurate sensor results. Further, the sensor 128 (as other elements) may provide different functionalities dependent on the cell phone mode (e.g., game, camera, navigation device, internet browser, etc.).

The processor 120 may be a conventional processor that is commercially available from Intel, AMD, Freescale, and Cyrix, among others. Similarly, the memory 122 may be a conventional memory that is commercially available. The memory 122 may include random-access memory (RAM) and/or read-only memory (ROM) that contain, for example, computer-accessible media. The processor 120 executes computer programs stored on the computer-accessible media.

Mobile devices in general can include one or more hard disk drives, flash memory, floppy disk drives, and optical disk drives. Mobile devices can be communicatively connected to the Internet via a wired or wireless connection in a manner well known in the art. Wired connections can be provided using, for example, a modem or Ethernet or similar network card connected to a local-area network (LAN) or a wide-area network (WAN) that itself is connected to the Internet via, for example, a T1 line. Wireless connections can be provided using WiFi or some other connection. The mobile devices may operate on operating systems such as Microsoft Windows®, Apple MacOS®, Linux®, and UNIX®. Examples are not limited to any particular operating system, however, and the construction and use of such operating systems are well known within the art.

As one of its functions, the processor 120 processes signals to provide depth imaging technology using signals from the cameras 110 and from the sensor 128. The cameras 110 produce a depth (stereoscopic) image with pixel values that represent distances of different parts of a scene to a plane. The depth image provides the 3D shape information of a scene regardless of texture variations (e.g., clothing and shadow variations), thereby permitting on-the-fly background substitution. Once the border between the foreground and background is established, an object in the foreground of the image can be separated from a background based on the pixel values from the stereoscopic image.

A substitute or replacement background is selectable from a library of images or videos such as tropical or historical locations. These images or videos can include well known locations, such as the Statue of Liberty, the Grand Canyon, the Eiffel Tower, or the Great Wall of China. Other images or videos can be created specially by the user or others such as indoor or outdoor scenes (e.g., a favorite location, the office of the president of the United States, a tropical island) or more fanciful locations such as outer space locations, underwater or underground locations, cartoon locations, etc.

The background substitution can be activated by the user while the user communicates visually as well as audibly (e.g., during teleconferencing) and/or textually. The manner in which the substitute background is selected can vary in a number of different ways. In one example, the user actuates a key on the device to show one or more backgrounds. The backgrounds can be displayed individually on the display 108. Alternatively, multiple backgrounds or a list of available backgrounds can be displayed at one time on the display. If one background at a time is displayed, it can be selected by actuating a particular user input (e.g. a soft or hard key etc.). In this case, the same input can be used to select different backgrounds depending on the particular background displayed when the input is actuated. If multiple backgrounds are displayed, different inputs can correspond to selection of the different backgrounds. A user input such as a wheel may be used to scroll through displays of the one or more backgrounds.

The substitute backgrounds can be stored in the memory 122 or can be stored in a memory external to the phone 100. For example, the background can be supplied from a memory in a remote site accessible through the Internet. As noted above, the user can select the background either prior to or after communication with other users is initiated.

Figure 3:
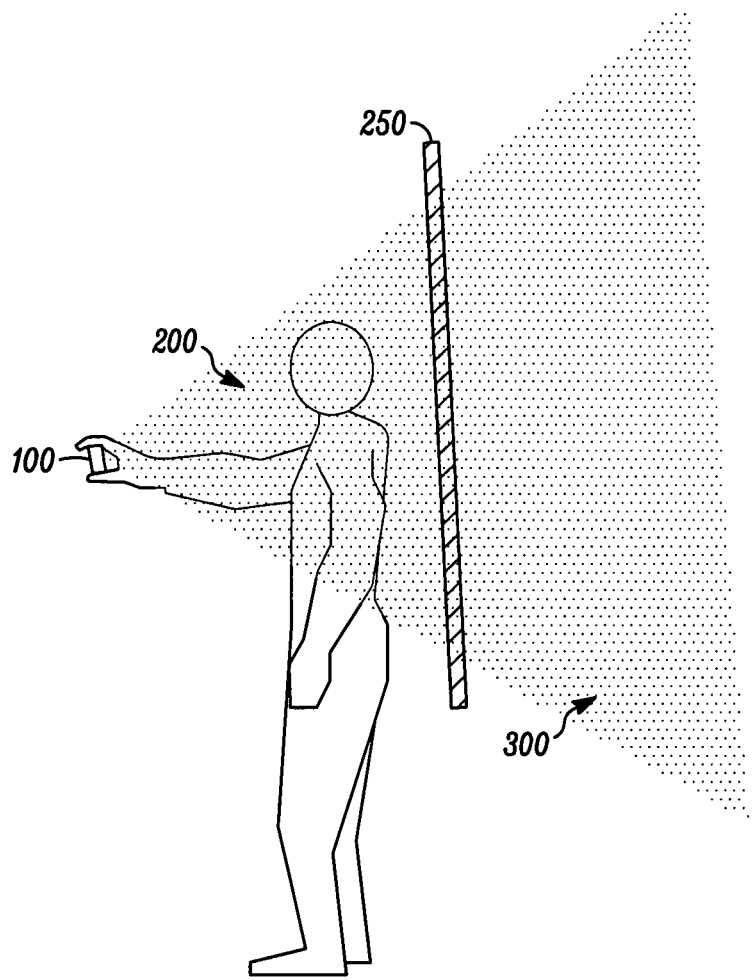
FIG. 3 illustrates one embodiment of background substitution using the mobile device of FIG. 1.

As shown in FIG. 3, the phone 100 obtains an image of the foreground 200 (e.g. a portion of the user such as the head and shoulders) and the background 300 using the cameras 110. The foreground 200 and background 300 are differentiated using a virtual barrier 250. This virtual barrier may be a plane positioned perpendicular to the field of view of the cameras 110 as shown in FIG. 3. Other possibilities exist in this regard, however. Such a virtual barrier could be tilted or angled as desired. This, in turn, can comprise an adjustable parameter that the end user can manipulate if so desired to adjust the tilt/angle. In another embodiment, more than one such virtual barrier may be used. For example, by one approach, two such barriers which meet at a ninety degree angle could be employed to meet particular needs in a particular application setting. Numerous other possibilities exist in other embodiments, for example, all or a part of such a barrier could be curved or have an irregularly-defined form factor. The background can be selected and/or replaced either prior to or after the communication session is initiated.

After (or before) the desired background is selected, the phone 100 segments the foreground 200 from the background 300. The selected background is then substituted for the background 300 behind the virtual barrier 250. The selected background is not limited only to still images, but also to images containing motion and videos. The substitute background may have a perspective that is the same as, or different from, the original background being substituted, depending on the use.

The depth of the virtual barrier 250 may be set manually using an input of the phone 100 (e.g., a wheel, up/down buttons, etc.) or automatically by the processor 120 once an initial depth has been set, as described in more detail below. To replace the background 300 effectively, the depth of the virtual barrier 250 may be adjusted to be, for example, immediately adjacent to the back of the user or, as shown in FIG. 3, somewhat (a few inches to a foot or so) behind the user. The former placement reduces the probability of other objects entering the frame if the user is in an environment in which this is likely, while the latter reduces the probability of the user intermittently intersecting the virtual barrier 250 and thus accidentally exiting the foreground 200. This can occur if the distance between the phone 100 and the user changes, for example, because the user's arm holding the phone 100 away from the remainder of the user's body (so that the camera 110 captures more than just the user's face) jiggles while the user is walking, or the user shifts position to sneeze, to reach for a document, etc.

If the substitute background itself contains motion (i.e., motion that is not dependent on the sensed movement of the phone 100), the motion can be isolated or rhythmic. Isolated motions can be, for example, animals or vehicles wandering through the frame. Rhythmic motions may be spliced into loops. For example, in a tropical island background, rhythmic motions can include lapping waves of the surf or palm trees swaying in the wind. Because rhythmic motions are repetitive, the file size of an animated background containing such motions remains relatively small, while still being able to react appropriately to unprogrammed movement of the device. Similarly, the file size of an animated background containing sporadic isolated motions is relatively small. In either case, the file size may be small enough to store in the memory 122.

After the new composite image containing the foreground 200 and the substitute background is formed, the substitute background may be modulated. As indicated, one or more sensors 128 are disposed in the phone 100. Modulation of the background substitution is based on the motion and attitude (tilt angle) of the phone. For example, an accelerometer can be used to determine the attitude of the device 100 based on the angle of gravitational acceleration. Accelerometers incorporated into current cell phones are sensitive to forces of 20 mG. Such sensors are adequate to detect movement of the cell phone sufficiently to provide feedback for realistic background changes. The sensor 128 may, alternately or in addition to the accelerometer, contain a gyroscope such as those used in commercial gaming devices.

To change the compound image, the background is collected while the foreground element is in motion. Then, in background substitution mode, the accelerometer is used a second time to synchronize the foreground with the stored background. In this manner, the substituted background appears to move in the opposite direction at the same rate of speed as the user. For example, if the user is walking, the scenery in the substituted background appears to increase or decrease in size or appears to be traversed at the desired rate. For more fantastic scenes, the rate can of course differ from the rate of speed of the user.

Figure 4:
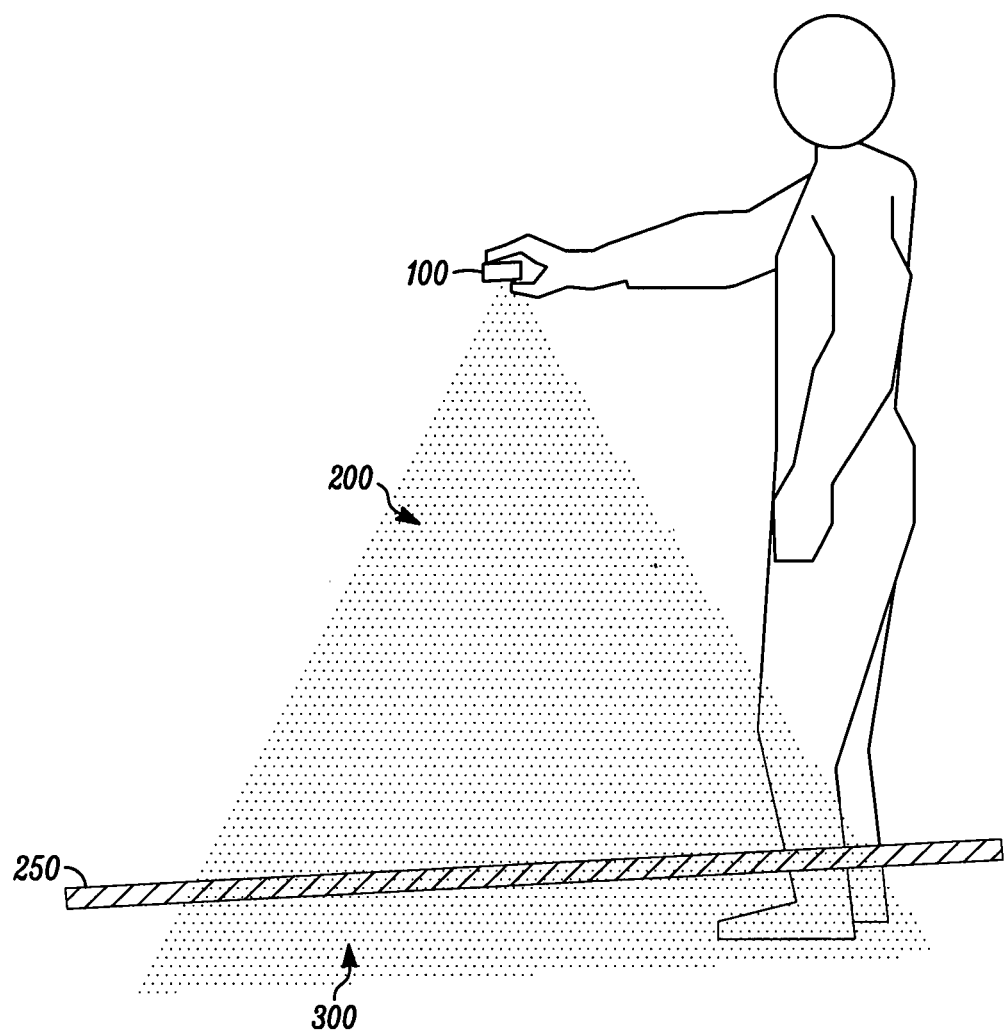
FIG. 4 illustrates alteration of the virtual barrier in the embodiment of background substitution of FIG. 3.

If the attitude of the phone 100 changes as the phone 100 is moved to capture a different foreground, the background and the virtual plane 250 may also be dynamically changed to correspond with the camera tilt. In the above tropical island example, the cameras 110 in the phone 100 may initially capture the upper body portion of the user and insert the tropical background so that it appears as if the backdrop of the user includes palm trees, sand, blue sky, and ocean. If the user then tilts the phone 100 so that the cameras 110 pan down, the substitute background smoothly adjusts downward at the same rate to eventually show the user's feet on sand, perhaps with waves lapping over the user's ankles, as shown in FIG. 4.

Figure 5:
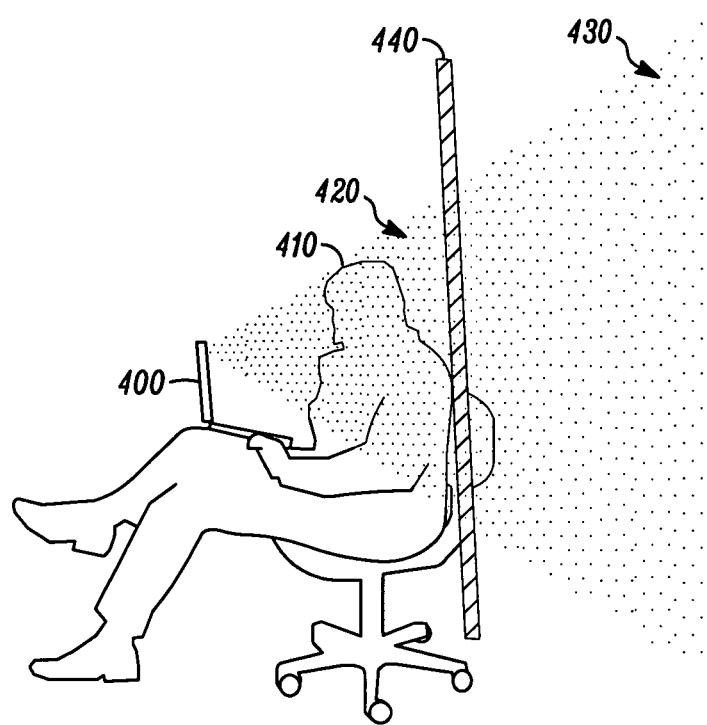
FIG. 5 illustrates a mobile device and original background in one embodiment.
Figure 6:
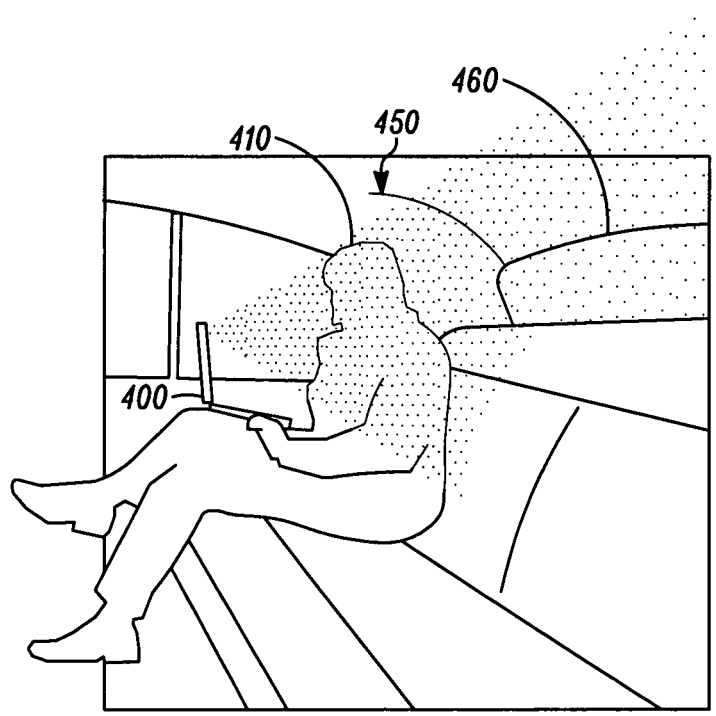
FIG. 6 illustrates the mobile device of FIG. 5 with substitute background according to one embodiment.

In another illustration, as above either the entire substitute background may be in motion or only a portion of the substitute background may be in motion (the remainder being static). For example, as shown in FIGS. 5 and 6, a laptop 400 captures a user 410 in the foreground 420 and an office in the background 430, which is separated from the foreground 420 by the virtual barrier 440. The background 430 is replaced and the substitute background 450 causes the videoconferencing user 410 to appear to be in a moving limousine 450 rather than sitting in the office 430. In this case, only the elements in the rear view window 460 of the limousine 450 that are seen by the videoconferencing audience may appear to be in motion if the laptop 400 remains motionless. If the position of the laptop 400 shifts during the videoconference, the sensor in the laptop 400 detects such the shift and changes the position of the limousine 450 and the moving elements in the window 460 accordingly (e.g. speeding up anything in the window 460).

In other examples, a background that contains complex motion can be substituted. For example, a user sitting at one airport (e.g., Newark in New Jersey) and videoconferencing using a laptop substitutes another, more exotic, airport (e.g., Heathrow in England, Orly in France, Narita in Japan). The complex elements can include individuals moving around or flights taking off or landing, for example. Such a background uses a larger amount of memory internal or external to the device compared with still images or images with simple motion.

Figure 7:
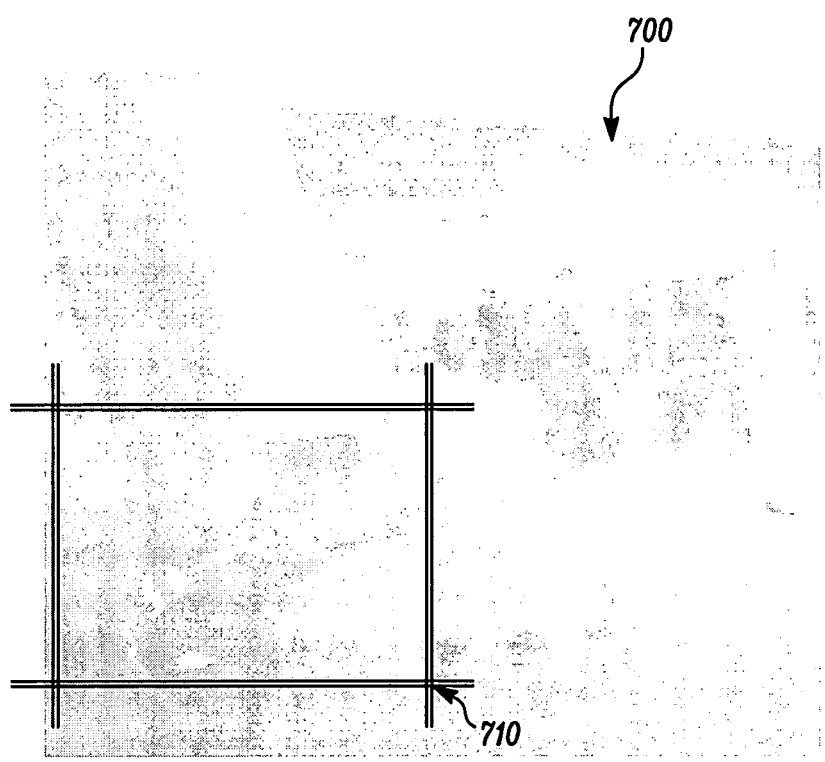
FIG. 7 illustrates selection of a portion of a large background according to one embodiment.
Figure 8:
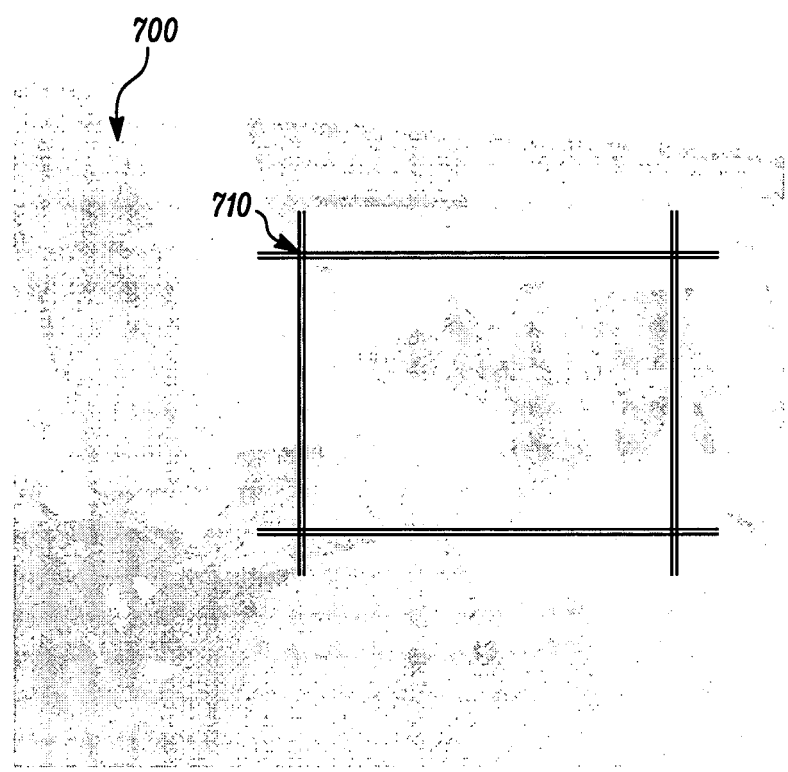
FIG. 8 illustrates movement of the selection of FIG. 7 according to one embodiment.

To achieve seamless motion of the background in correspondence with movement of the device, the substitute background may be a portion of a larger image or video rather than being a patchwork of isolated images that are stitched together. In particular, as shown in FIGS. 7 and 8, a stationary video recording 700 of the desired background is taken and then stored. Only a portion 710 of the substitute background 700 is used. The substitute background 710 pans about within the wider perspective, stationary video 700 in correspondence with the motion of the device. If the portion 710 reaches an edge of the substitute background 700, the portion 710 seamlessly loops to a different section of the substitute background 700. Of course, the video 700 may be large enough to avoid looping altogether. Similarly, if the background does not have moving elements, a large still image can be used instead of a video.

Figure 9:
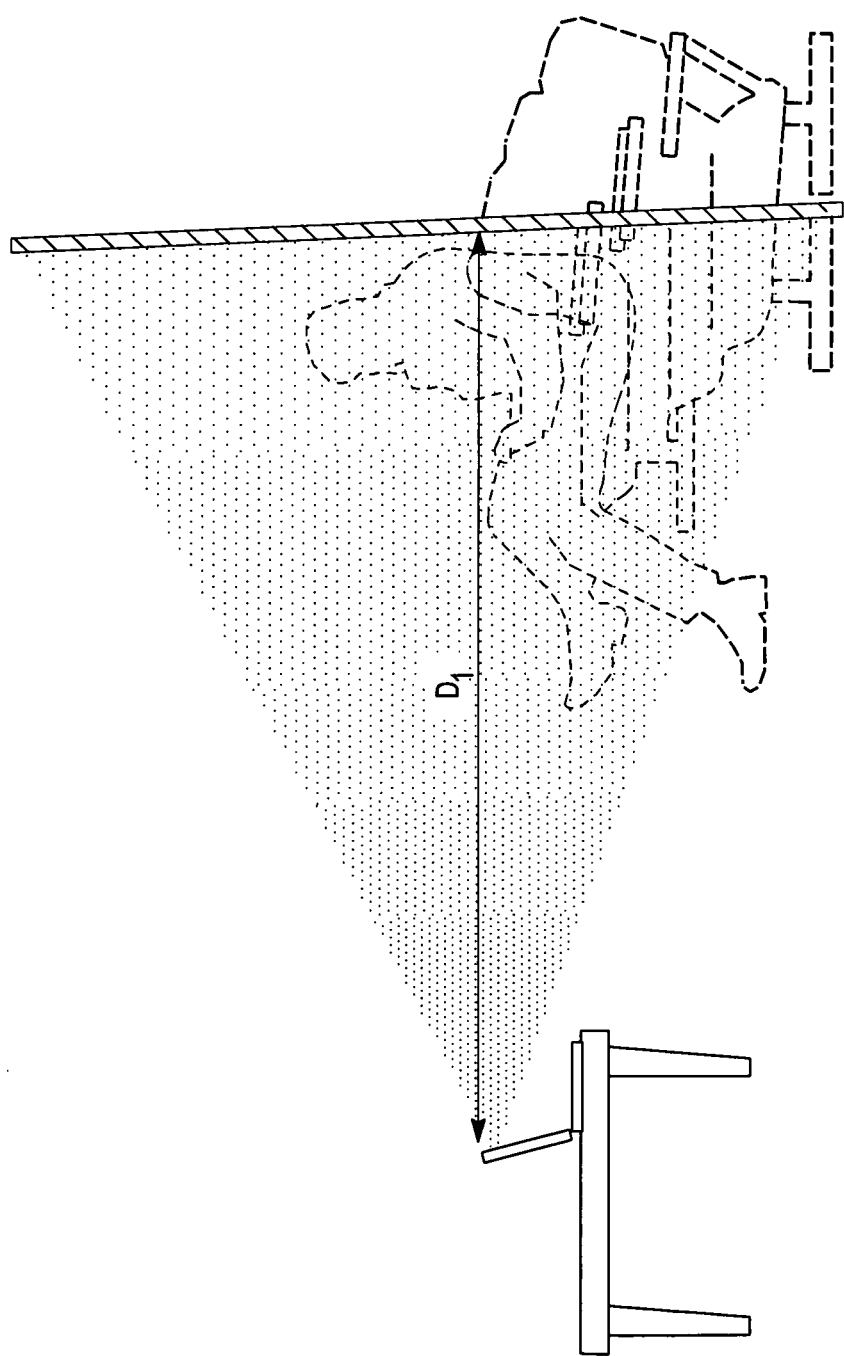
FIG. 9 illustrates background capture according to one embodiment.
Figure 10:
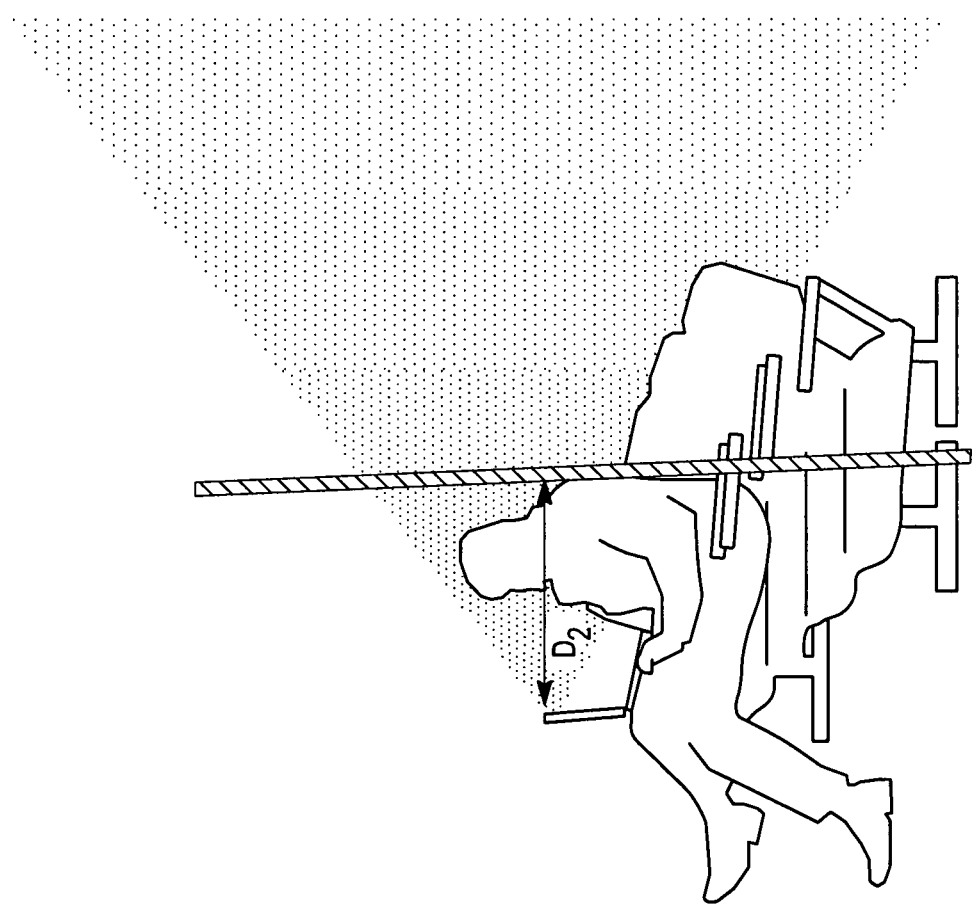
FIG. 10 illustrates usage of the background capture of FIG. 9 according to one embodiment.

If a large stationary image is desired, the device captures a wider perspective than that to be used during substitution. One manner in which this is achieved is by positioning the stationary device containing the camera further away during image capture (as shown by distance $D_1$ in FIG. 9) than the device is to be used during substitution (as shown by distance $D_2$ in FIG. 10). Alternately, the image can be captured using a fish-eye lens and then correcting the distorted image using known image processing algorithms. It is also possible to combine these techniques.

As above, the original image can be processed by either or both the mobile device or by a remote site. Similarly, buffering of the new composite image can occur by either or both the mobile device or a remote site. In one embodiment, the substitute background is stored wholly in the mobile device and replaces the original background of the captured image. The new composite image is then transmitted to receiving devices in communication with the mobile device, as well as displayed by the mobile device if desired. Thus, in this embodiment, all of the image processing described is performed by the mobile device. In another embodiment, the original depth image (along with information of the virtual barrier and device movement) is sent to the remote site in which a substitute background has already been selected. The original background is stripped from the foreground and replaced with the substitute background at the remote site. The new composite image is then transmitted to receiving devices in communication with the mobile device, as well as the mobile device if desired. Thus, in this embodiment, all of the image processing described is performed at the remote site.

In another embodiment, the substitute background is stored in the remote site. The mobile device selects the substitute background, which is then supplied to the mobile device. The mobile device determines which portion of the received background is used as the substitute background depending on the device movement and replaces the original background with the portion. In another embodiment, the substitute background is stored in the remote site. The mobile device selects the substitute background and sends the selection information as well as the information of device movement and perhaps the virtual barrier to the remote site. The portion of the substitute background to replace the original background is determined and sent to the mobile device. The mobile device replaces the original background with the received substitute background. Thus, in these embodiments, each of the mobile device and the remote site provide a portion of the image processing described.

Figure 11:
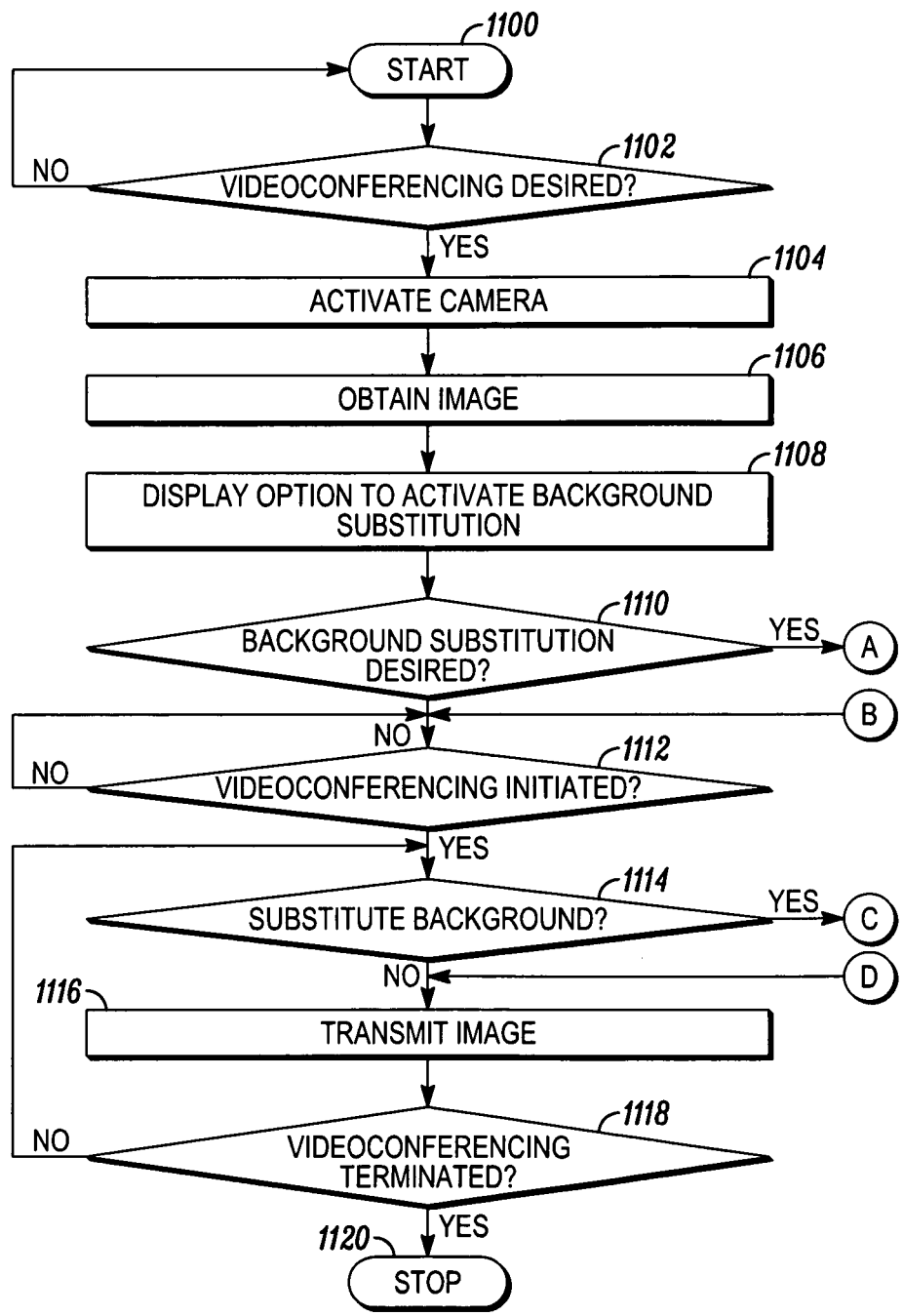
FIG. 11 shows a flowchart according to one embodiment.
Figure 12:
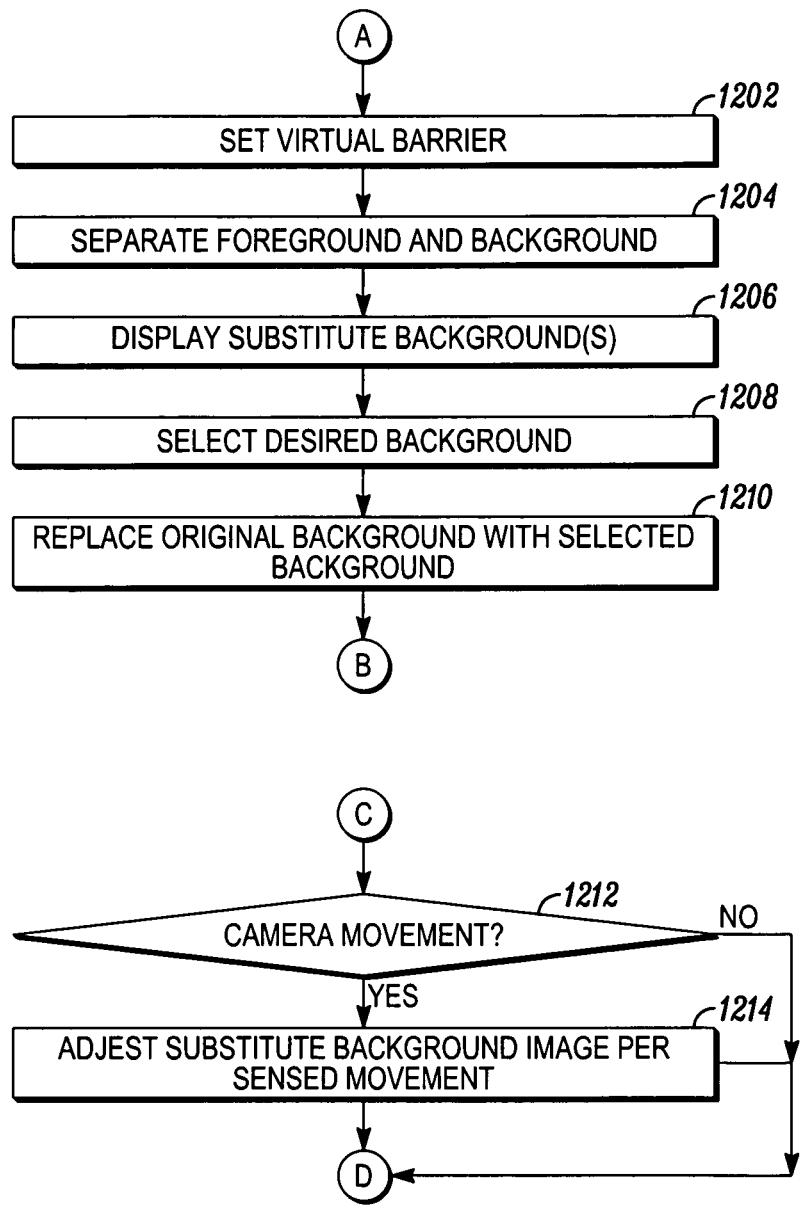
FIG. 12 continues the flowchart of FIG. 11.

A flowchart of one embodiment of a method of providing videoconferencing is shown in FIGS. 11 and 12. At the start 1100 of the method, the device determines at step 1102 whether the user has actuated an input to start videoconferencing. If the input has been actuated, the cameras on the device are actuated at step 1104. The cameras take a depth image at step 1106 and the display on the device shows an option whether to provide a substitute background at step 1108. The device determines whether the user has actuated an input to substitute the background at step 1110. The device then waits until other users are connected and thus videoconferencing has begun at step 1112. Once videoconferencing has been detected, and if the background has not been substituted at step 1114, an image is transmitted (either the original image or the new composite image) at step 1116. The device then detects whether videoconferencing has ended at step 1118. If videoconferencing has not ended, the device continues to transmit images at step 1116, whether or not the background has been substituted at step 1114, and if videoconferencing has ended, the process terminates at step 1120.

After the device determines that the user has actuated an input to substitute the background at step 1110, the placement of the virtual barrier is established by the user at step 1202 and the foreground and background are separated at step 1204. Regardless of their location, one or more substitute backgrounds are displayed by the device at step 1206. One background is selected by the user actuating an input on the device at step 1208 and the original background is then replaced with the selected background at step 1210. This new composite image is then transmitted during videoconferencing at step 1114.

If the background has been substituted at step 1114, the accelerometer, gyroscope, or other sensor in the device detects whether the device is moving at step 1212 and moves the background accordingly with respect to the foreground at step 1214. The final composite image is then transmitted during videoconferencing at step 1116.

Note that the positioning of the various steps shown in FIGS. 11 and 12 may be altered as desired. For example, whether the background substitution occurs before or after video conferencing is selected as desired.

Although typically the camera captures images of visible wavelengths, in other embodiments, an infrared or other type of camera may be used. In other embodiments, a video may be created and stored in the mobile device, but may not be transmitted. Such a video, for example, might be shown to others from the same mobile device. The video might also be transferred by non-wireless means, such as by a memory card or wired connection.

It will be understood that the terms and expressions used herein have the ordinary meaning as is accorded to such terms and expressions with respect to their corresponding respective areas of inquiry and study except where specific meanings otherwise have been set forth herein. Relational terms such as first and second and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Those skilled in the art will recognize that a wide variety of modifications, alterations, and combinations can be made with respect to the above described embodiments without departing from the spirit and scope of the invention defined by the claims, and that such modifications, alterations, and combinations are to be viewed as being within the inventive concept. Thus, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made and all equivalents of those claims as issued.

The invention claimed is:

1. A mobile device comprising:
    an imager configured to provide a first depth image including a first foreground and a first original background and a subsequent second depth image including a second foreground and a second original background;
    a storage configured to store a substitute background;
    a sensor configured to sense movement of the mobile device; and
    a processor configured to:
        separate the first foreground from the first original background of the first depth image,
        replace the first original background with the substitute background to form a first composite image
        modulate the substitute background as a function of a movement of the mobile device sensed by the sensor to form a modulated substitute background, and
        replace the second original background with the modulated substitute background to form a second composite image.

2. The mobile device of claim 1, further comprising a user-actuated input to adjust a virtual barrier defining a separation point between the respective first and second foregrounds and the respective first and second original backgrounds.

3. The mobile device of claim 1, wherein the sensor comprises an accelerometer.

4. The mobile device of claim 1, further comprising:
    a user-activated input; and
    a memory configured to store a plurality of substitute backgrounds that are selectable by the user-activated input.

5. The mobile device of claim 1, further comprising a transceiver and a user-activated input configured to select the substitute background from a plurality of substitute backgrounds stored in a remote site and to cause the processor to retrieve the substitute background via the transceiver.

6. The mobile device of claim 5, further comprising a memory configured to store the selected substitute background prior to replacing the first original background.

7. The mobile device of claim 1, wherein the substitute background is selected from a first portion of a larger background, and wherein modulating the substitute background comprises shifting a current selection of the larger background from the first portion to a second portion of the larger background different from the first portion.

8. The mobile device of claim 1, wherein the imager is a stereo camera system.

9. The mobile device of claim 1, wherein the modulating of the substitute background is executed at a rate of motion and an attitude to match a rate of movement and attitude of movement of the mobile station sensed by the sensor.

10. The mobile device of claim 1, wherein the substitute background contains a separate motion that is independent of the sensed movement, and wherein the modulation of the substitute background is executed as a function of both the separate motion and the sensed movement.

11. The mobile device of claim 1, further comprising a display configured to display the first and second composite images to the user.

12. The mobile device of claim 1, wherein the processor is configured to automatically adjust a position of a virtual barrier defining a separation point between the respective first and second foregrounds and the respective first and second original backgrounds as a function of the movement of the mobile device sensed by the sensor.

13. A method of providing composite images from a mobile device, the method comprising:
   obtaining a first depth image using an imager in the mobile device, the depth image including a first foreground and a first original background;
   detecting movement of the mobile device using a sensor in the mobile device;
   obtaining a second depth image using the imager in the mobile device, the second depth image including a second foreground and a second original background;
   separating the first foreground from the first original background of the first depth image;
   replacing the first original background with a pre-stored substitute background to form a first composite image;
   modulating the substitute background as a function of the movement of the mobile device detected by the sensor to form a modulated substitute background;
   replacing the second original background with the modulated substitute background to form a second composite image.

14. The method of claim 13, further comprising automatically adjusting a virtual barrier defining a separation point between the respective first and second foregrounds and the respective first and second original backgrounds as a function of the movement of the mobile device sensed by the sensor.

15. The method of claim 13, further comprising:
   storing a plurality of substitute backgrounds in a memory external to the mobile device;
   retrieving a selected one of the substitute backgrounds from the memory; and
   locally storing the selected one of the substitute backgrounds prior to replacing the first original background in a memory in the mobile device.

16. The method of claim 13, wherein the substitute background is selected from a first portion of a larger background, and wherein modulating the substitute background comprises shifting a current selection of the larger background from the first portion to a second portion of the larger background different from the first portion.

17. The method of claim 13, wherein the substitute background contains a separate motion that is independent of the detected movement, and wherein modulating the substitute background comprises modulating the substitute image as a function of both the separate motion and the sensed movement.

18. The method of claim 13, further comprising displaying the first and second composite images on a display of the mobile device.

19. The method of claim 13, wherein the separating, replacing, and modulating is performed in the mobile device.

20. The method of claim 13, wherein at least one of the separating, replacing, and modulating is performed external to the mobile device.

* * * * *